June 13, 1950     O. WATMOUGH     2,511,521

FIELD MARKER

Filed April 6, 1949

Inventor
Oliver Watmough
by W. S. J. M. M.
ATTORNEY

Patented June 13, 1950

2,511,521

UNITED STATES PATENT OFFICE 2,511,521

FIELD MARKER

Oliver Watmough, Lethbridge, Alberta, Canada

Application April 6, 1949, Serial No. 85,745
In Canada December 13, 1948

3 Claims. (Cl. 97—228)

This invention relates to a distance marker for use in agriculture at such times as the farmer may want to mark out a land line or maintain such a line on the ground on a course parallel with and at a predetermined distance from a farm machine by which it is towed, and following the same route but at a certain distance to one side or other of the machine, and acting as a guide to the operator of the machine to which it is so attached.

An advantage of importance in my invention is that it maintains a straight course by itself at all times when trailed to one side or the other, and it is so designed that the plowed earth displaced in a furrow formation leaves a distinct marking in the wake of the device.

This machine may be used to considerable advantage for wide swathing, and its guiding feature is especially evident to the operator during the following round or swath for marking out the limits when spraying, and prevents overlapping of the spraying fluid, which might seriously injure the crop if allowed to occur, and it may also be used successfully for crop dusting operations in similarly outlining limiting areas during the process.

The device is of very simple construction, and adjustments may be made so that the width of a marking furrow may be varied by changing the angularity of its harrowing disc.

With the object and advantages mentioned in view this invention consists in the novel features of construction hereinafter described and claimed, and in the drawings accompanying this specification it must be observed that similar numerals refer to similar parts throughout the views.

Figure 1:
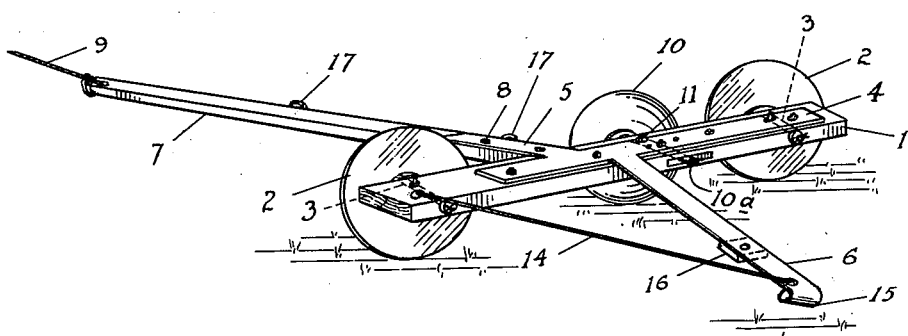
Fig. 1 is an elevational perspective view of the machine.
Figure 2:
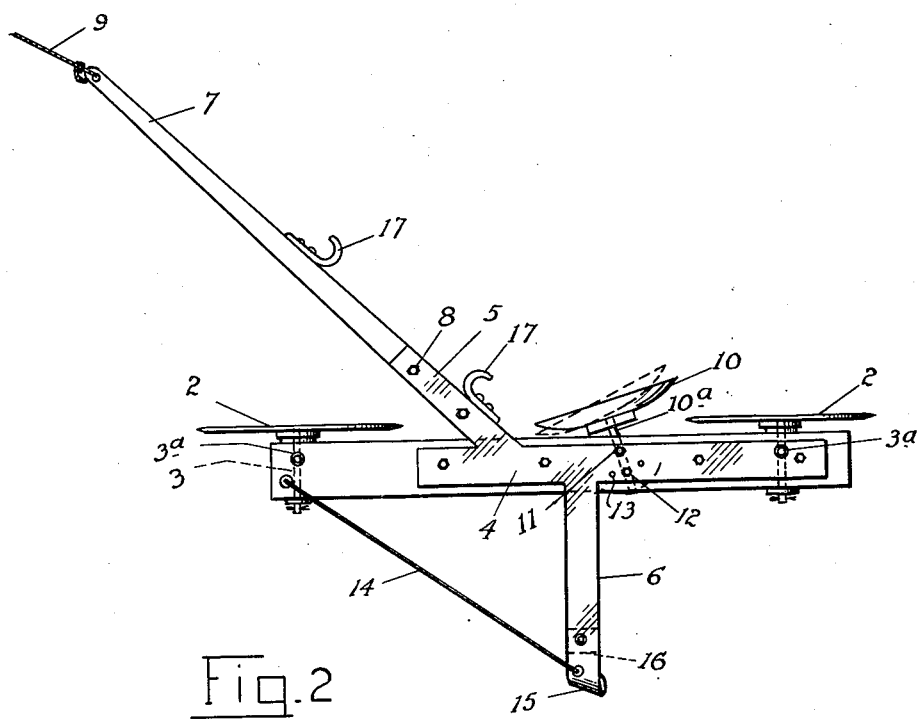
Fig. 2 is a plan view.

In these drawings the numeral 1 refers to beam forming the principal supporting member of the machine, which beam may be of any suitable dimension. A flat disc 2 is mounted near to each end of this beam having a spindle 3 for each such disc to rotate on journaled transversely through the beam. Grease cups 3a are disposed above the said spindles. Additional discs could be placed on the opposite side of this beam if found advisable, the two discs alone have proved satisfactory in practice, and are here shown as the preferred arrangement.

A plate 4 is bolted longitudinally along the top face of the beam 1, integral with which are two projecting arms one arm 5 on the leading side of the plate projecting at an approximate angle of forty-five degrees with the lead end of the beam, and the other arm 6 projecting perpendicularly or approximately perpendicularly from about the middle of the beam in a trailing direction. A tongue member 7 is attached by bolts 8 to the underside of the arm 5 to the end of which tongue is attached a cord or chain or cable 9 for towing the device behind and to one side of a tractor or other mobile vehicle. This towing at an offset distance is the essential purpose of this device.

The arm 5 branches off the plate 4 slightly forwardly of the rear arm 6 with reference to the forward travel of the device.

A convex disc 10 is journaled to the beam 1 in the same manner as the two end discs, but the spindle of this middle disc, as seen at 10a, is pivoted on the beam plate 4 by a pin 11. This spindle is arcuately adjustable as shown by a bolt 12 in holes 13 through the plate and beam. In this manner the spindle 10a may be swung radially for the angular adjustment of this disc. This disc is of the conventional shape and its convex face is the means of digging the marking furrow, and is of slightly less diameter than the two end discs.

A taut wire or metal strip 14 is strung or braced between the leading end of the beam 1 and the trailing end of the arm 6 and is a guard to prevent the stems of the crop from gathering against the arm 6 and the beam, which clogging might divert the machine from its straight course.

The ground contacting end of the arm 6 is rolled under as at 15, and is so streamlined as to prevent digging in should the arm touch the ground when travelling. A counter-weight 16 is attached to this arm 6 to balance the tongue 7 and keep it off the ground in readiness for starting operations.

The towing arm or tongue 7, projecting forwardly of the device, prevents the marker from turning over on short turns in the field, and it is the means by which the discs are maintained upright in action, and guides them when travelling.

Hooks 17 are mounted on the tongue on which to wind the cable 9 when the apparatus is not in use or being transported.

In the operation of this device the distance of the marking furrow to one side of the vehicle is of course determined by the length of the tow line. The device is so designed that on turning it completely over it is adapted for trailing on the opposite side of the machine by which it is being hauled. Consequently only one such device is required for marking on either side of the vehicle, which obviates any change of structure thereof.

The fact that the tow line is flexible and not of a rigid nature keeps the device in a proper operational position, and thus the device is readily adjusted for correct disposition of furrow markings.

What I desire to secure by Letters Patent is:

1. A land marker as described, comprising a horizontal beam, fore and aft vertical flat discs rotatably mounted sidewisely in tandem on said beam as a means of guiding the beam, a concavo-convex disc rotatably mounted in between said flat discs and so axially angularly positioned relative to the longitudinal axis of the beam as to provide a furrow in the soil when travelling, a tongue projecting forwardly at a proper hauling angle to the longitudinal axis of the beam, an arm projecting laterally from the said beam on the side thereof opposite to said tongue to support the marker primarily when at rest, and means to connect the tongue with a vehicle for trailing the beam and its discs to one side thereof, and along a course parallel with that of the said vehicle.

2. A marker for use in the field when trailed to one side of a hauling vehicle, comprising a more or less horizontal beam, a pair of vertical rotative flat discs mounted in tandem on one side of and to carry said beam, a rotatable concave furrowing disc of less diameter than said flat discs and mounted on a spindle in between the same, means to adjust the angularity of said concave disc in a horizontal direction to increase or to decrease the width of the furrow made by the disc, a plate attached longitudinally to the top face of said beam, an arm integral with said plate and projecting angularly therefrom at one side thereof and at an acute angle relative to the leading end of the beam, a tongue attached to said arm with cable connection with the hauling vehicle, an arm intergral with said plate projecting perpendicularly and laterally from the other trailing side thereof as a means of preventing the marker from overturning, and having a streamlined ground contacting end, and a counterbalance weight on said trailing arm.

3. A field marker device as defined in claim 2 to which is added a taut wire or metal strip between said projecting arm and the leading end of said beam to keep the device cleared of crop stems and trash when travelling.

OLIVER WATMOUGH.

REFERENCES CITED

The following references are of record in the file of this patent:

UNITED STATES PATENTS

| Number | Name | Date |
|---|---|---|
| 605,963 | Linthicum | June 21, 1898 |
| 2,457,151 | Hester | Dec. 28, 1948 |